United States Patent
Steelman et al.

(10) Patent No.: US 6,706,131 B2
(45) Date of Patent: Mar. 16, 2004

(54) FILM LAMINATION AND REMOVAL SYSTEM AND METHODS OF USE

(75) Inventors: Ronald S. Steelman, Woodbury, MN (US); John R. David, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/244,861

(22) Filed: Sep. 17, 2002

(65) Prior Publication Data

US 2003/0015298 A1 Jan. 23, 2003

Related U.S. Application Data

(63) Continuation-in-part of application No. PCT/US01/10682, filed on May 17, 2001, and a continuation-in-part of application No. 09/759,993, filed on Jan. 12, 2001, and a continuation-in-part of application No. PCT/US00/27247, filed on Oct. 30, 2000, and a continuation-in-part of application No. 09/576,624, filed on May 23, 2000.

(51) Int. Cl.[7] ................................................. B32B 31/20
(52) U.S. Cl. ........................ 156/71; 156/285; 156/344; 156/381; 156/576; 156/574; 156/584
(58) Field of Search .................................. 156/574, 387, 156/382, 497, 285, 361, 582, 71, 160, 163, 164, 324, 357, 378, 64, 344, 584; 100/90

(56) References Cited

U.S. PATENT DOCUMENTS

| | | |
|---|---|---|
| 4,204,904 A | 5/1980 | Tabor |
| 4,751,121 A | 6/1988 | Kuhnel et al. |
| 4,867,816 A | 9/1989 | Suiter |
| 4,944,514 A | 7/1990 | Suiter |
| 5,122,959 A | 6/1992 | Nathanson et al. |
| 5,800,919 A | 9/1998 | Peacock et al. |

FOREIGN PATENT DOCUMENTS

| | | |
|---|---|---|
| DE | 2160144 | 7/1973 |
| DE | 197 33 935 C2 | 11/1999 |
| EP | 0 354 230 B1 | 3/1992 |
| EP | 0 787 539 A2 A3 | 8/1997 |
| FR | 2 300 249 | 9/1976 |
| FR | 2 643 487 A1 | 8/1990 |
| FR | 2 743 963 A1 | 7/1997 |
| GB | 1135928 | 12/1968 |
| JP | 63-059517 | 3/1988 |
| JP | 01-123723 | 5/1989 |
| WO | WO 89/05829 | 6/1989 |
| WO | WO 92/17870 | 10/1992 |
| WO | WO 97/31077 | 8/1997 |
| WO | WO 98/29516 | 7/1998 |
| WO | WO 00/43196 | 7/2000 |
| WO | WO 00/43220 | 7/2000 |

OTHER PUBLICATIONS

Brady, H., "Ten Steps to Successful Vinyl Truck Lettering," *SignCraft Magazine*, Issue 74, 3 pages (Jan./Feb. 1994).

Primary Examiner—Richard Crispino
Assistant Examiner—George R. Koch, III
(74) Attorney, Agent, or Firm—Sean J. Edman

(57) ABSTRACT

Vacuum-assisted film laminating and removal systems and methods of using the same. The systems include a vacuum-assisted laminator for applying large format films to substrates where lamination pressure is generated at least partially by a vacuum drawn in a vacuum cavity. The removal apparatus applies tension over the width of the adhesive film, thereby removing the film from the substrate along the release line that extends over the width of the film. The systems and methods can be used to apply and remove large-scale adhesive films from substrates.

33 Claims, 12 Drawing Sheets

FILM LAMINATION AND REMOVAL SYSTEM AND METHODS OF USE

RELATED APPLICATIONS

This is a continuation-in-part application of U.S. Ser. No. 09/576,624, titled "Steered Vacuum-Assisted Laminating Apparatus and Methods of Use," filed May 23, 2000 and a continuation-in-part application of U.S. Ser. No. 09/759,993, titled "Adhesive Film Removal Method and Apparatus," filed Jan. 12, 2001.

FIELD OF INVENTION

This invention concerns systems and methods for laminating and removing films. More particularly, the present invention provides an integrated film lamination and removal system and methods of using the same.

BACKGROUND OF INVENTION

Adhesive coated films are often used or applied to a variety of surfaces for reasons such as advertisement, decoration, protection, etc. In some instances these films may be used in place of painting to protect surfaces or to provide a uniform appearance, such as to a fleet of trucks. Regardless of their specific use, these films, which are often exposed to environmental conditions, have a finite life and must be removed prior to replacement.

The lamination of films often requires that pressure be supplied to force the film against a substrate to which it is to laminated. The substrate to which the film is to be laminated may be another film, a fabric, a structure (e.g., the side of vehicle, a wall, etc.) or any other object. The films are often coated with an adhesive to adhere the film to the substrate, but lamination of the adhesive-coated film under pressure often assists in providing a more secure bond between the film and the substrate. The use of pressure may also provide other advantages, e.g., reducing bubble formation, improving conformity, etc.

Although it is desirable to use pressure when laminating a film to a substrate, it can be difficult to provide enough pressure to effectively influence the lamination process. For example, when laminating two films to each other over, e.g. a roll structure, allowances must be made for deflection of the rolls because the lamination force can typically be applied only at the ends of the rolls. The result is that the size and weight of the rolls and supporting structure may be massive to compensate for roll deflection while generating sufficient and uniform pressure at the lamination point.

Another example can be found in the application of adhesive-coated plastic films, especially vinyl films, to a variety of surfaces for a variety of reasons such as advertisement, decoration, protection and the like. These surfaces can be very large in area, typically as much as 3 m×16 m. These films are adhered to very large horizontal or vertical surfaces such as walls, truck trailer sides, billboards, and the like. The films are seldom large enough to cover the entire surface with a single, integral film, so multiple films are typically used. In addition, attempts to make larger films result in films that are more difficult to handle and to register to other films. These surfaces have vast even and uneven portions, such as a truck trailer side that has flat surfaces interrupted by either corrugations or rivets, or both. These surfaces with some combination of flat portions, protrusions, and indentations require very skilled persons to adhere the film to the surfaces and then assure that such film adheres also to the protrusions or indentations, or both.

In the most common methods of applying these films to, e.g., truck trailers, a small plastic squeegee approximately 10 cm long is typically used to manually force the film against the substrate. This is a very labor intensive process. Furthermore, this application requires skill and patience to get an application that is well adhered, free of wrinkles, and in which all films are in register.

Removal of these adhesive coated films also presents difficulties due to the size of the films. The adhesives used to apply the films to the substrates also typically have a relatively high adhesion, making their removal somewhat difficult. Removal is currently accomplished by hand with an individual attempting to pull the film off of the substrate. It is difficult, if not impossible, for an individual to exert sufficient force to remove the entire sheet of film across its width at the same time.

As a result, the individual may be forced to remove small sections of the film, with the film often breaking during removal because of the forces concentrated at the removal location. To assist with removal, many individuals often cut the film into strips while on the substrate and remove the strips individually. Drawbacks to this approach however include the potential for damage to the underlying substrate as well as the additional labor required to cut the film prior to removal.

SUMMARY OF INVENTION

The present invention provides a vacuum-assisted film laminating and removal systems and methods of using the same. The systems include a vacuum-assisted laminator for applying large format films to substrates where lamination pressure is generated at least partially by a vacuum drawn in a vacuum cavity. The removal apparatus applies tension over the width of the adhesive film, thereby removing the film from the substrate along the release line that extends over the width of the film. The methods and apparatus are particularly useful in removing large-scale films from substrates such as truck trailers, vans, walls, signs and other large surfaces.

The systems and methods may be particularly useful to assist in the application and/or removal of adhesive-coated plastic films, particularly vinyl films, to large area surfaces to provide improved appearance, durability, etc. Some of the most common surfaces include truck sides, walls, signs, portions of a building, vehicles, etc. These large surfaces require extensive time and labor for application of films. This often adds more cost to the project that does the film itself. Furthermore, many of these applications are on surfaces that contain compound-curved protrusions or indentations such as channels or rivets or other irregularities that increase application time and often produce wrinkles.

The present invention uses the force generated by a partial vacuum at the interface of application, to adhere adhesive-coated films to large area surfaces. The technique is also especially effective on smaller, irregular surfaces.

Even when applied with a vacuum-assisted laminator, accurate alignment of the laminator relative to the substrate to which a film is to be applied may be important. The present invention also can provide steering systems that can be used to control the vertical position the laminator, distance between the laminator and the substrate, and can also move the laminator along the substrate in a desired direction.

In one aspect, the present invention provides a film lamination and removal system that includes a laminator having spaced-apart first and second laminating rolls mounted parallel to each other, a seal mechanism extending between the first and second rolls, wherein the seal mechanism forms a seal with each of the first and second rolls, a vacuum cavity formed between the seal mechanism and the first and second rolls, and a vacuum port in fluid communication with the vacuum cavity. The system further includes a removal apparatus operatively coupled to the laminator, the removal apparatus including a winding roll attached to a frame, and a motor operably connected to the winding roll for rotating the winding roll about its longitudinal axis.

In another aspect, the present invention provides a method of using a system such as that described in the preceding paragraph to laminate an adhesive film to a substrate. The method includes locating the system proximate a substrate, wherein the substrate further defines the vacuum cavity; locating an adhesive film between the substrate and at least one of the first and second laminating rolls; drawing a vacuum through the vacuum port, wherein a negative pressure is provided in the vacuum cavity and wherein the first and second laminating rolls are drawn towards the substrate; and moving the system along the substrate in a lamination direction, whereby the adhesive film is laminated to the substrate.

In another aspect, the present invention provides a method of laminating and removing adhesive films from a substrate. The method includes providing a film lamination and removal system that includes a laminator having spaced-apart first and second laminating rolls mounted parallel to each other, a seal mechanism extending between the first and second rolls, wherein the seal mechanism forms a seal with each of the first and second rolls, a vacuum cavity formed between the seal mechanism and the first and second rolls, and a vacuum port in fluid communication with the vacuum cavity. The system further includes a removal apparatus operatively coupled to the laminator, the removal apparatus including a winding roll attached to a frame, and a motor operably connected to the winding roll for rotating the winding roll about its longitudinal axis. After providing such a system, the method includes locating the system proximate a substrate, wherein the substrate further defines the vacuum cavity; applying tension to a first end of an existing adhesive film adhered to a substrate over the width of the existing adhesive film to remove the existing adhesive film from the substrate along a release line; distributing the tension on the substrate in the form of a compressive force; advancing the release line and the compressive force towards a second end of the existing adhesive film, whereby the existing adhesive film is removed from the substrate; locating a new adhesive film between the substrate and at least one of the first and second laminating rolls; drawing a vacuum through the vacuum port, wherein a negative pressure is provided in the vacuum cavity and wherein the first and second laminating rolls are drawn towards the substrate; and moving the system along the substrate in a lamination direction, whereby the new adhesive film is laminated to the substrate.

One feature of the present invention is the laminator which utilizes a partial vacuum, also known as negative pressure, in a vacuum cavity of the laminator to generate pressure on the laminator at the interface between the laminator and the substrate where a film is subsequently laminated. The resulting lamination pressure is essentially uniform across the lamination area because the negative pressures within the vacuum cavity are substantially equal.

When used to apply graphic images and other films to, e.g., trucks, other vehicles, sign surfaces, buildings, etc., one advantage of the present invention is labor savings of such significance that the overall total cost of an adhesive film applied to a large vertical or horizontal substrate, especially one having multiple compound or irregular surfaces can be substantially reduced. Furthermore, the quality of application is significantly improved, and often, lower adhesion adhesives can be used which reduce removal time. Even with the cost of film remaining constant, the labor savings reduces the total cost of application of the film by as much as 80%.

When, in conjunction with vacuum, heat is used in the lamination process, the conformability of the film around irregular or compound-curved surfaces is improved such that less aggressive adhesives can be used. These adhesives, often called removable or changeable adhesives, can save 80% of the time normally associated with removal of adhesive films. This can further cut the total cost of installed and removed applied films by as much as 60%.

With these substantial labor savings using the article and method of the present invention, one company can provide an entire product of both film goods and installation/removal services at a price considerable less than currently offered where the producer of the film goods and the installer of the film goods are unrelated companies.

Another advantage of the invention is that large sheets of film can be laminated to surfaces at high productivity of speed and assured lamination.

Another advantage of the invention is that the laminator can provide nearly 100% wetting area of the adhesive against the surface of the substrate whereas conventional squeegee usage can only achieve about 80% wetting. The use of a partial vacuum uses the power of a fluid to apply equal pressure at every point of contact of the film to the surface, something that is extremely difficult, if not impossible, to achieve when applying pressure with a device such as a squeegee. That advantage is even more apparent with surfaces that are filled with irregularities or compound curves or both.

The systems and methods of the present invention may also be used to remove existing laminated films. Films laminated by vacuum-assisted laminators may be even more difficult to remove by hand, thereby making use of the present invention with its integrated removal apparatus even more advantageous.

When used in connection with a vacuum-assisted lamination system, it may be preferred to mount the film removal apparatus of the present invention ahead of the laminator, thereby providing an integrated system that can be used to remove an existing adhesive film from the substrate and replacing it with a new film in one pass. Such an integrated system may also take advantage of the steering and other features provided with the lamination systems.

The systems of the present invention may also be used in combination with the vacuum-assisted adhesive film laminating apparatus disclosed in U.S. patent application Ser. No. 09/236,806 filed on Jan. 25, 1999 titled INTERSECTING HEAT AND PRESSURE FILM APPLICATOR AND METHODS OF USING SAME and U.S. patent application Ser. No. 09/479,648 filed on Jan. 7, 2000 titled METHOD OF APPLYING ADHESIVE COATED FILM.

The tension applied to the adhesive film during removal is preferably uniform across the width of the film, thereby reducing the risk of the film tearing or breaking during removal. The release line is advanced during removal along the length of the film until the entire film is removed from the substrate.

One removal apparatus for removing adhesive films according to the present invention includes a roll that is operably connected to a winding mechanism that can supply adequate torque to remove the adhesive film from the substrate. The winding mechanism may include a torque limiter to reduce or prevent the likelihood of breaking the film during removal. Power for the winding mechanism may be provided by any suitable device, e.g., electric motor, air motor, hydraulic motor, etc.

Optionally, it may be desired to distribute the tension forces applied to the film back to the substrate in the form of a compressive force with the compressive force being applied to the substrate proximate the release line. The compressive force may be applied by any suitable structure, although a roll is typically preferred to avoid damage to the underlying substrate.

The tension forces may not need to be applied back to the substrate where the film removal apparatus itself is sufficiently rigid and robust to withstand the tension applied during removal of the film.

The systems and methods may be particularly useful to assist in the removal of adhesive-coated plastic films, particularly vinyl films, from large area surfaces after the films have reached the end of their useful life. Some of the most common surfaces include truck sides, walls, signs, portions of a building, vehicles, etc. Extensive time and labor may be required to remove adhesive films from these large surfaces.

It may be preferred that the systems and methods of the invention be used in connection with the application and/or removal of large-scale adhesive films from substrates. For the purposes of the present invention, a "large-scale adhesive film" is a film having a width of 70 centimeters or more and a length of 2 meters or more.

As used in connection with the present invention, the term "vacuum" is used to describe negative pressure as compared to ambient pressure. The term does not require that an absolute or extremely negative pressure vacuum be drawn or maintained, although in some instances it may be possible and/or desirable to achieve large negative pressures in connection with the present invention.

Other features and advantages will be described below using the following drawings.

ILLUSTRATIVE EMBODIMENTS OF THE INVENTION

Figure 1:
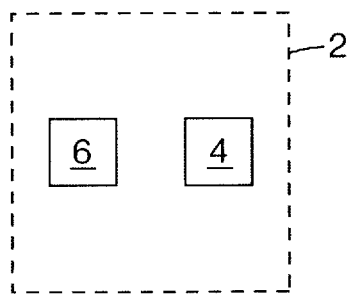
FIG. 1 is a schematic diagram of one integrated film lamination and removal system according to the present invention.

FIG. 1 is a schematic diagram of one system 2 according to the present invention that includes both an adhesive film laminator 4 and film removal apparatus 6 in an integrated system that is capable of removing an existing adhesive film and laminating a new adhesive film to a substrate in a single pass.

Figure 2:
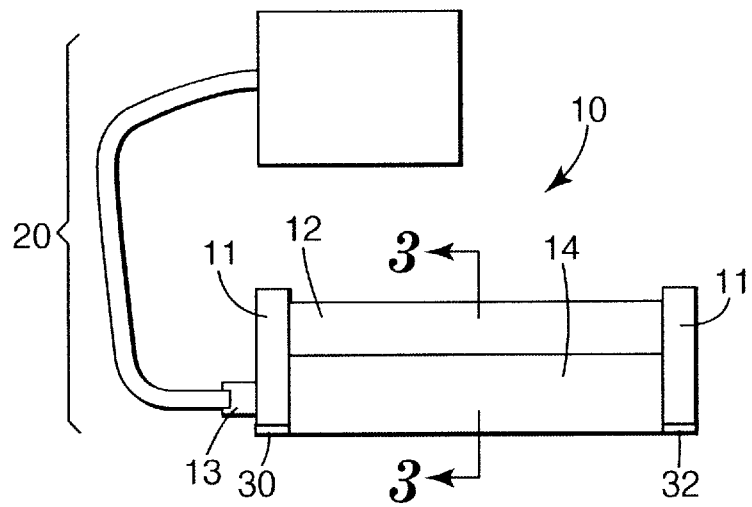
FIG. 2 is a diagrammatic front view of one lamination apparatus of the present invention.
Figure 3:
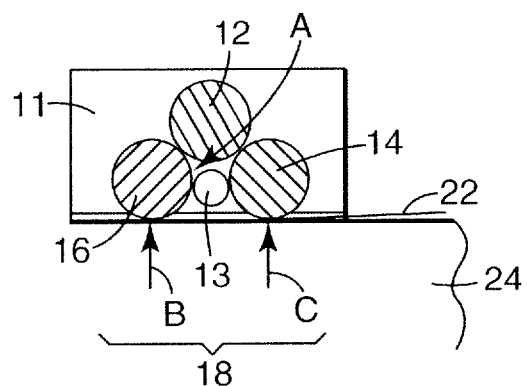
FIG. 3 is a diagrammatic cross-sectional view of the apparatus of FIG. 2 along lines 3—3 in FIG. 2.

FIGS. 2 and 3 show one laminator 10 having a frame 11. At least one end of the frame 11 includes a vacuum port 13 in fluid communication with a vacuum cavity A formed in between the rolls 12, 14, and 16. The rolls 12, 14, and 16 combine to defined the vacuum cavity A and to provide lamination pressure on a film. The rolls 12, 14 and 16 are preferably circular and rotate about longitudinal axes extending through their centers. The longitudinal axes of the rolls are generally parallel to each other.

The laminator 10 may also include a vacuum or negative pressure source 20 that generates a partial vacuum (negative pressure) within the vacuum cavity A. That vacuum draws the outer rolls 14 and 16 against film 22 and the substrate 24 to provide the desired lamination pressure.

The substrate 24 on which the outer rolls 14 and 16 are mounted may be flat, or it may be curved such as, e.g., a roll. Furthermore, substrate 24 may be another film located on a flat or curved surface and to which the film 22 is to be laminated. In other applications, the substrate may be flexible, but under tension such as, e.g., a fabric surface used on a truck trailer.

Although the illustrative embodiments depicted herein rely on sealing rolls, the seal mechanisms used in the laminating apparatus of the present invention could alternatively be replaced with multiple rolls or a hard shell with vacuum seals against the outer rolls 14 and 16.

Figure 4:
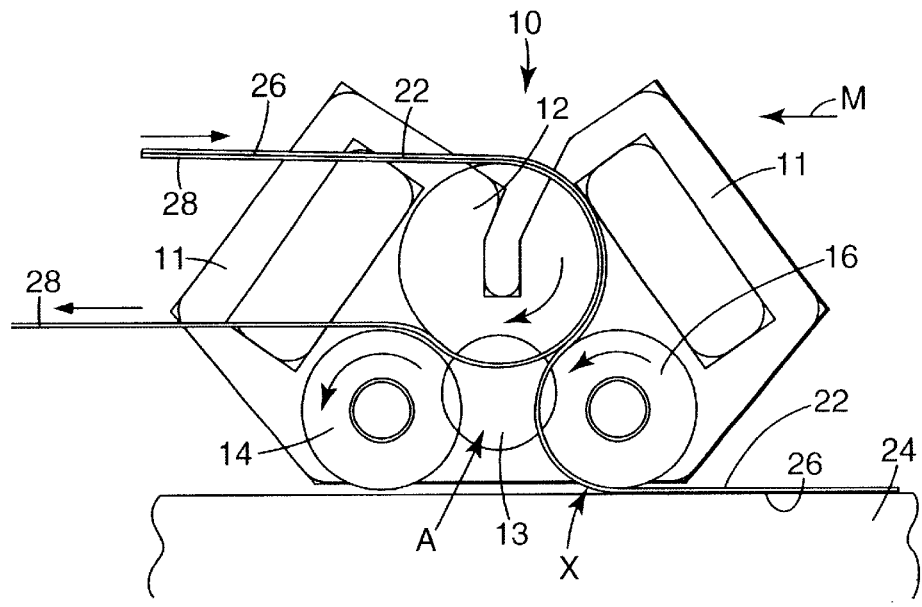
FIG. 4 is a diagrammatic side view of one use of a lamination apparatus of the present invention.

As seen in FIG. 4, the film 22 may include, e.g., a coating of a pressure sensitive or pressure activated adhesive 26 protected by a liner 28. The lamination apparatus 10 greatly aids in the lamination of, e.g., pressure sensitive adhesive coated films to surfaces such as truck sides, signs, etc. As discussed below, the present invention also provides vacuum-assisted lamination apparatus and methods that can be used to laminate two sheets or films together in continuous web processes.

The outer rolls 14 and 16 of the laminator 10 are provided to seal against a substrate surface 24 as well as to provide the desired lamination pressure along those nip points. One of the outer rolls 14 and 16 may be harder or less conformable that the other to improve lamination. One or both of the nips formed between the outer rolls 14 and 16 may also include a film 22 being laminated to the substrate surface 24. The sealing roll 12 is provided to define and seal the vacuum cavity A between the outer rolls 14 and 16. The sealing roll 12 forms a rolling seal with each of the outer rolls 14 and 16. The sealing roll 12 may also provide a nip point at which a liner or other layer can be stripped from a film before it is laminated to the substrate surface 24.

It may be desirable that at least a portion of the sealing roll 12 be transparent, such that the vacuum cavity A can be visually monitored during lamination. In some instances, the transparent portion may extend over the length of the roll 12, and in other instances, only a portion of the length may be transparent.

Referring to FIG. 3, the force of negative pressure from source 20 (see FIG. 2) generates a partial vacuum within vacuum cavity A between the rolls 12, 14, and 16 and the substrate 24. Subatmospheric pressure within the vacuum cavity A, compared with ambient pressure outside of vacuum cavity A then draws the rolls 12, 14, and 16 and the surface 24 together, thus creating pressure on the surface of rolls 14 and 16 in contact with the substrate surface at contact interfaces B and C. The pressure distributed over the length of the rolls is at least partially dependent on (1) the distance between interfaces B and C times the length of laminator 18, (2) the negative pressures that can be obtained in the vacuum cavity A. For example, the lamination pressure at interfaces B and C may be about 175 Newtons/m (1 lbs./in) or more, more preferably about 250 Newtons/m or more. In some instances, it may be desirable to achieve pressures of about 2000 Newtons/m or more, even more desirably, about 2000 Newtons/m or more, and still more desirably about 3000 Newtons/m or more.

The upper pressure limit will depend on a variety of factors such as the strength of the components used in the lamination apparatus 10, the capabilities of the vacuum source, the strength of the surface 24 to which films are being laminated, etc. In some instances it may be desirable to provide a pressure relief device or devices to relieve excessive pressures before the lamination force becomes too great. Pressures in excess of 4500 Newtons/m are possible with 30 cm roll spacing and only 30% air evacuation in the vacuum cavity.

A set of rolls 12, 14, and 16 that are each 137 cm (about 54 inches) long with a distance of 20.3 cm (8 inches) between interfaces B and C and a standard shop vacuum as source 20 that generates 27.4 kPa could apply 3818 Newtons per roll or 2,783 Newtons/m (858 lbs./roll or 15.89 lbs/lineal in./roll) of force to each of the two rolls 14 and 16 at each of interfaces B and C. Using conventional frames and mounting systems, it would be very difficult to apply that much pressure to the rolls without either deflecting the rolls or the substrate surface. Such a frame would also be massive, very heavy, and very difficult to handle by persons skilled in the art, especially against a vertical surface.

Optionally but preferably, FIG. 2 shows conformable seals 30 and 32 on frame 11 to assist in the formation of negative pressure within the vacuum cavity A in the two directions orthogonal to interfaces B and C.

Because vacuum is used to supply the lamination forces and the negative pressure is distributed substantially equally over the surfaces of the rolls 12, 14, and 16, relatively insubstantial roll structures are required for rolls 12, 14, and 16. In many instances, the roll structures may include hollow cores. Those lightweight structures can be contrasted with the massive metal rolls that would otherwise be required for positive pressure lamination using rolls to limit undesirable roll deflection near the middle of the rolls. The rolls used in the lamination apparatus of the present invention may, in some instances, weigh less than one-tenth of the conventional metallic rolls needed to apply over 3800 Newtons of force with a similar length device.

The rolls used in the apparatus and methods of the present invention may preferably include outer surfaces that are soft enough to conform to the substrate surface. The use of conformable rolls may improve sealing at the nip points between the rolls, which can assist in the generation and maintenance of desirable negative pressure levels in the vacuum cavity. The conformability may also be useful to improve contact between the rolls and films being laminated when confronting irregularities or compound curves on the surface. Thus, if the substrate surface contains raised or lower areas, such as rivets or dents, soft rolls are desired to insure complete compliance of the film with the substrate surface. A soft rubber roll with a high coefficient of friction to the pressure sensitive film works very well on riveted surfaces. Another possible roll composition is foam rubber.

Furthermore, it has been found that an intimate contact of the film to the roll at the interface of application to the substrate helps prevent wrinkling from occurring when applied over rivets and on irregular surfaces. A high degree of wrap also aids in supporting the film.

Presently preferred for surfaces containing irregularities is a soft rubber roll having a Shore Scale hardness of from about Shore 00 10 to about Shore A 60, more preferably from about Shore 00 30 to about Shore A 30. If the substrate does not contain irregularities, harder roll surfaces (e.g., metallic surfaces) may be used and can potentially develop higher pressures as compared to softer rolls.

The diameters of the rolls 12, 14, and 16 can vary depending on a number of factors such as the lamination pressures desired, the length of the rolls, etc. It may be desirable that the relative diameters of the rolls possess certain relationships. For example, it may be desirable that the outer rolls 14 and 16 have substantially equal diameters. It may also be preferred that the sealing roll 12 located between both outer rolls 14 and 16 have a larger diameter than the outer rolls 14 and 16 to increase the spacing between the outer rolls 14 and 16 without making all of the rolls larger. In some instances, the distance (D) between the centers of the outer rolls 14 and 16 may be determined by the following equation:

$$D=\sqrt{(2AB+A^2)}$$

where A is the diameter of each of the outer rolls 14 and 16 (which are the same) and B is the diameter of the sealing roll 12 to reduce or prevent the rolls from bending when a vacuum is drawn in the vacuum cavity A.

In some instances, such as the application of polymeric films to, e.g., truck trailers, the rolls 14 and 16 may have diameters ranging from about 4 cm to about 23 cm, preferably from about 5 cm to about 13 cm.

It may be desirable that the size and construction of the rolls 12, 14, and 16 be such that, during lamination, the outer rolls 14 and 16 deflect or bow inwardly towards each other. Alternatively, it may be desirable if only the outer roll or rolls around which a film is wrapped deflect or bow inwardly. Such deflection may assist in reducing wrinkles in the lamination process by, in effect, spreading the film outwardly from the center of the deflected rolls. The deflection may be controlled by varying the tension on the film or films wrapped around the deflected roll or rolls. The deflection may also be controlled by varying the negative pressure in the vacuum cavity A, varying roll size, or varying spacing between outer rolls 14 and 16. In some instances, it may be desirable to use flexible rolls for laminating films on curved surfaces.

The applicator 10 can be mounted on horizontal or vertical rails or any other suitable structure for wide webs (greater than about 60 cm) or can be hand held or mounted on a hand held pole for narrow webs (less than about 30 cm). Therefore, the width of the applicator 10 can be varied according to the needs of those skilled in the art and can be used to adhere films ranging from wallpaper to graphic marking film marketed by Minnesota Mining and Manufacturing Company (3M) of St. Paul, Minn., USA under the brands of CONTROLTAC and SCOTCHCAL films.

FIG. 4 shows one use of the laminator 10 of the present invention. A laminate of film 22, adhesive 26, and liner 28 (protecting adhesive 26) are threaded between sealing roll 12 and roll 16 and separate between roll 12 and roll 16, with liner 28 following the circumference of roll 12 to roll 14 and the adhesive-coated film 22 following the circumference of roll 16 to a point of contact with substrate 24, indicated as interface X within vacuum cavity A. Within vacuum cavity A, the outer roll 16 forces the adhesive 26 on film 22 against substrate 24 at interface X as rolls 14 and 16 rotate counterclockwise and sealing roll 12 rotates clockwise (as shown with appropriate arrows) and interface X advances in the direction of motion M.

Figure 5:
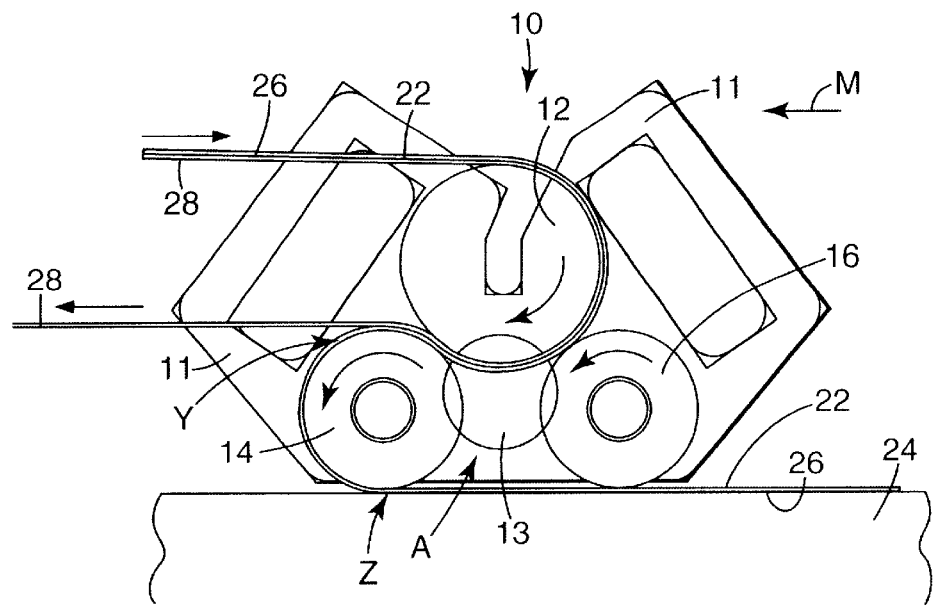
FIG. 5 is a diagrammatic side view of another use of a lamination apparatus of the present invention.

FIG. 5 shows another threading of film/liner laminate, where film 22, adhesive 26, and liner 28 enter the laminator 10 between roll 12 and roll 16 from the direction toward which applicator 10 moves (motion M). Thus the laminate of film 22 and liner 28 contacts the circumference of sealing roll 12, but the point of delamination occurs at point Y between roll 12 and roll 14 with liner 28 returning the same direction as motion M. In this embodiment, the film 22 first contacts substrate 24 outside of vacuum cavity A but is forced against the substrate 24 by outer roll 14 at interface Z once motion M causes film 22 to enter vacuum cavity A. Outer roll 16 also provides a laminating force against the film 22 and substrate 24.

Figure 6:
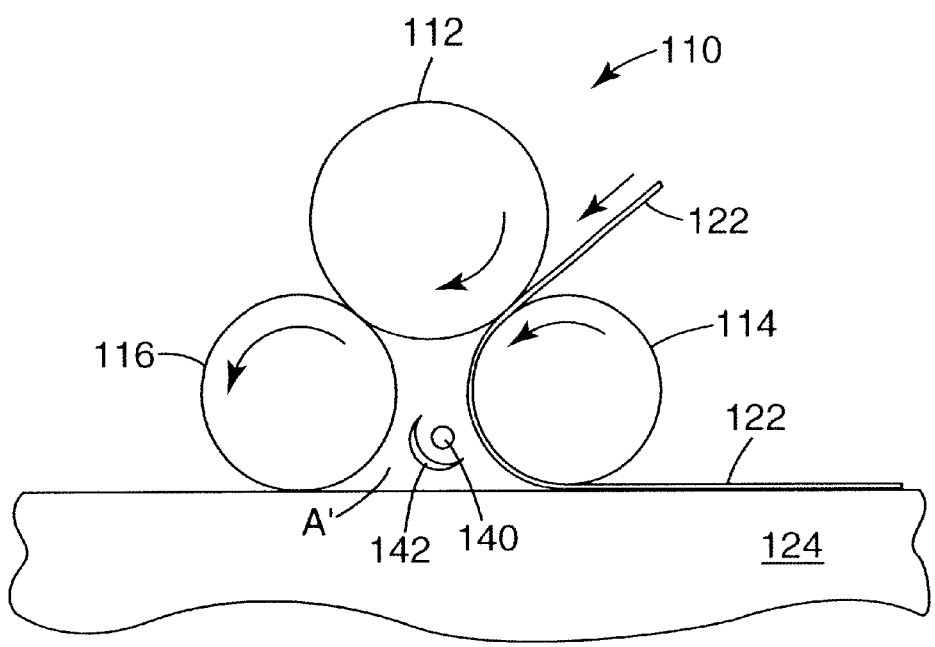
FIG. 6 is a diagrammatic side view of another lamination apparatus according to the present invention.

To improve lamination, one or both of the outer rolls 14 and 16 could also be heated. Referring to FIG. 6, in another alternative, a heating device may be positioned either outside of the laminator 110 to heat a film before it enters the vacuum cavity A' or, as illustrated in FIG. 6, a heating device 140 may be located within vacuum cavity A' to heat the film 122. The heating device 140 may include a heat shield to at least partially control the direction in which thermal energy travels. Examples of suitable heating devices include, but are not limited to: infrared heaters, resistance heaters, carbon filaments, quartz irradiators, etc. If the heat is applied while the film is outside the vacuum cavity, e.g., before entering or after exiting the vacuum chamber, hot air may be used.

The use of heat in connection with laminating films is disclosed in copending, commonly-assigned, U.S. patent application Ser. No. 09/236,806, filed on Jan. 25, 1999 and its continuation-in-part patent application, U.S. patent application Ser. No. 09/479,648 filed on Jan. 7, 2000.

The laminators of the present invention could ride on a mounting frame or otherwise conveyed across the surface of the substrate. Furthermore, the substrate surface may be drawn toward the rolls so any uneven or flexible film is easier to use with the applicator of the present invention than with a pressure system.

Laminators manufactured according to the present invention permit one skilled in the art to apply film 22 in subatmospheric pressure (FIG. 4) or atmospheric pressure (FIG. 4) using vacuum-assisted lamination pressures to quickly and assuredly adhere the film 22 against the substrate 24 even if such substrate 24 has surface aberrations, compound curves, or irregularities compared with a flat surface. The substrate can be aligned vertically or horizontally. The apparatus can traverse in any desired direction, e.g., horizontally, vertically, etc. Alternatively, the apparatus may remain stationary while the substrate moves.

Furthermore, the lamination pressures that can be achieved are not reliant on the forces used to move the laminator into position against a surface. For example, the lamination apparatus may be held on an extend pole above the head of, e.g., an operator. After a vacuum is drawn in the vacuum cavity, the laminator can supply the desired lamination forces independent of the forces provided by the operator on, e.g., the outer frame of the device. In another example, the lamination apparatus may be suspended on ropes, cables, or other structures that move it into position over a substrate. Activation of the vacuum source can then draw the laminator against the substrate to provide the desired lamination pressures.

Any adhesive-coated film can benefit from the applicator of the present invention, e.g., heat activated adhesives can be used in conjunction with heat. Nonlimiting examples of such films include any film presently sold by Minnesota Mining and Manufacturing Company (3M) of St. Paul, Minn., USA under the brands of SCOTCHCAL; CONTROLTAC; and the like.

It has been found that an adhesive-coated film, namely: CONTROLTAC 180 film can be successfully adhered using the applicator of the present invention. It has also been found that as much as 80% of the time normally required for adhering a typical film can be saved, reducing the total cost of adhering such film by as much as 40%.

An entirely new business method can be created using the applicator and methods of the present invention. The business method may include contracting with an owner of an image to make that image on an adhesive film, wherein the maker of the adhesive film prints the image and assembles the adhesive film onto a substrate using the applicator and method of the present invention. Alternatively, the film maker can subcontract the use of the applicator and method to permit remote subcontractor(s) to assemble the adhesive film(s) on the substrate(s) for further distribution or usage. Preferably, the image is distributed to multiple remote locations and printed and assembled using the same techniques at all locations, all benefiting from the labor savings afforded by the applicators and methods of the present invention.

The vacuum assist applicator of the present invention can also be used to "finish" a pressure sensitive film that is lightly adhered to a surface, in which case it would not pass between the rolls, but the rolls would only apply high pressure.

Figure 7:
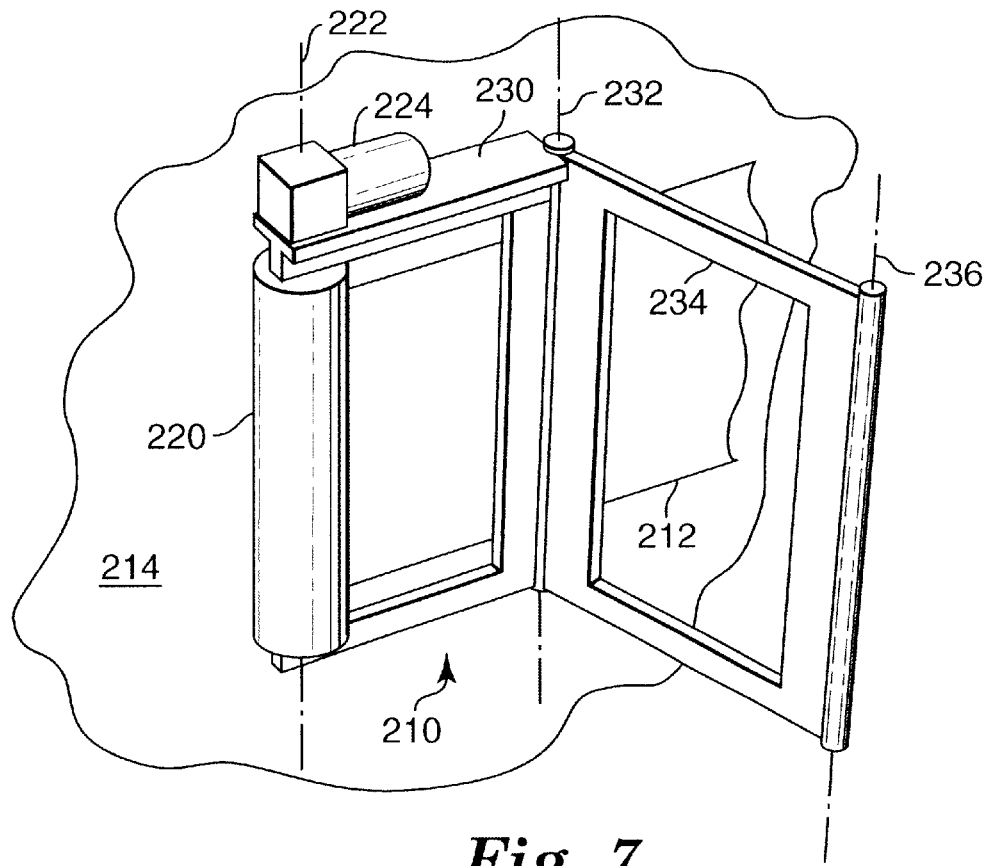
FIG. 7 is a perspective view of one film removal apparatus according to the present invention.
Figure 8:
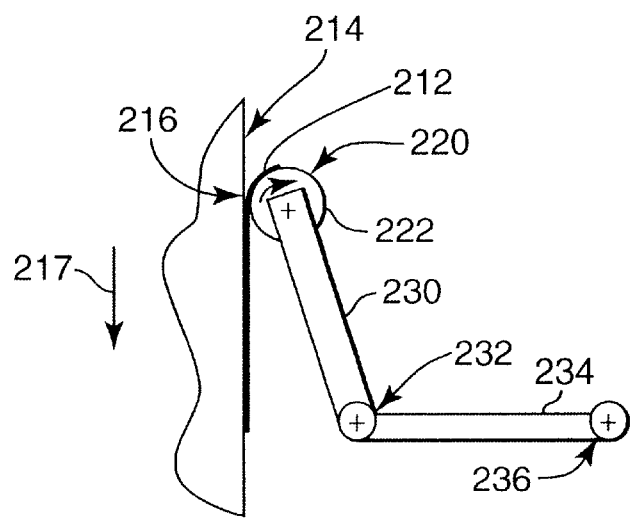
FIG. 8 is a view of the film removal apparatus of FIG. 7 taken upward along the longitudinal axis 222 in FIG. 7.

FIGS. 7 and 8 depict one illustrative embodiment of an apparatus useful in connection with the methods out of the present invention. The apparatus 210 includes a winding roll 220 that rotates about a longitudinal axis 222. During removal of the adhesive film 212 from the substrate 214, the winding roll 220 is rotated about its axis 222 to remove film 212 from the substrate 214 along a release line 216 as seen in FIG. 8.

The substrate 214 on which the adhesive film 212 is laminated may be flat, or it may be curved such as, e.g., a roll. Furthermore, substrate 214 may be another film located on a flat or curved surface and to which the film 212 is laminated. The substrate 214 may be rigid, e.g., a building wall, truck trailer side, etc., or it may be flexible, but under tension such as, e.g., a fabric surface used on a truck trailer.

The winding roll 220 is preferably driven by a motor 224 which rotates the roll 220 about its longitudinal axis 222. The motor 224 can take any suitable configuration. For example, the motor 224 may be electric motor, and air motor, a hydraulic motor, etc. It may be desirable that the motor 224 also includes a torque limiter to limit the maximum amount of torque that can be applied to the adhesive film 212 by the winding roll 220 during the removal process. Torque limiting may be accomplished in a variety of manners such as by an additional torque limiting mechanism located between the motor 224 and the winding roll 220 (e.g., a clutch), by limiting the current to an electric motor, limiting the air pressure provided to an air motor, limiting the hydraulic fluid pressure provided to a hydraulic motor, etc. Other techniques of limiting torque will be known to those skilled in the art.

The winding roll 220 is mounted on a roll frame 230 that is preferably, itself, mounted for rotation about an axis 232. By allowing the roll frame 230 to rotate about axis 232, the winding roll 220 may more closely followed the contour of the substrate 214 on which adhesive film 212 is located. In addition, rotation of the roll frame 230 will also compensate for the increasing diameter of the winding roll 220 if the adhesive film is wound on that roll as it is removed from the substrate 214.

The roll frame 230 may also be rotatably connected to a subframe 234 which, itself, rotates about an axis 236. As a result, the winding roll 220 may be mounted to the end of a two beam linkage formed by roll frame 230 and subframe 234. That additional axis of rotation (236) may provide for additional compliance and movement of the winding roll 220 when removing the adhesive film 212 from the substrate 214.

During the removal process, the apparatus 210 is preferably moved relative to the substrate 214 in the direction of arrow 217 in FIG. 8. That movement may alternatively be described as transverse to the width of the film 212 (where the film length is transverse to its width). Relative movement between the apparatus 210 and the substrate 214 is all that is required. It may often be desired to move the film removal apparatus 210 while the substrate 214 remains stationary, although in some instances the substrate 214 may be moved relative to a stationary apparatus 210 or both the apparatus 210 and the substrate 214 may move during film removal.

As the film removal apparatus 210 depicted in FIGS. 7 and 8 operates, the tension applied to the adhesive film 212 during removal from the substrate 214 may be transferred directly to the substrate 214 (particularly where the frame 230 and winding roll 220 are supported separately from the substrate 214). More typically, however, the tension applied to the adhesive film 212 during the removal process will be transferred back to the substrate 214 in the form of a compressive force by the roll 220. That compressive force will be applied at, or slightly ahead of, the release line 216. Although in many instances this configuration may be suitable, it may be desirable to separate the release line 216 and compressive force by some distance to avoid increasing the adhesive forces generated between the adhesive film 212 and the substrate 214 just prior to removal of that film 212.

Figure 9:
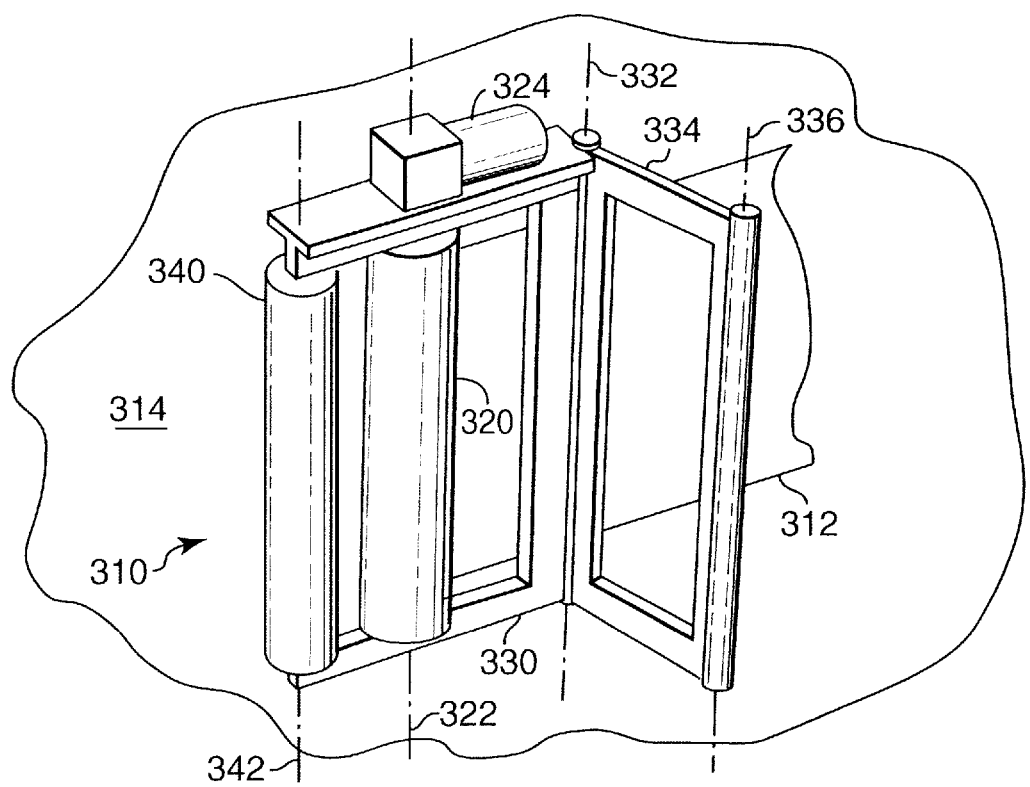
FIG. 9 is a perspective view of another film removal apparatus according to the present invention.
Figure 10:
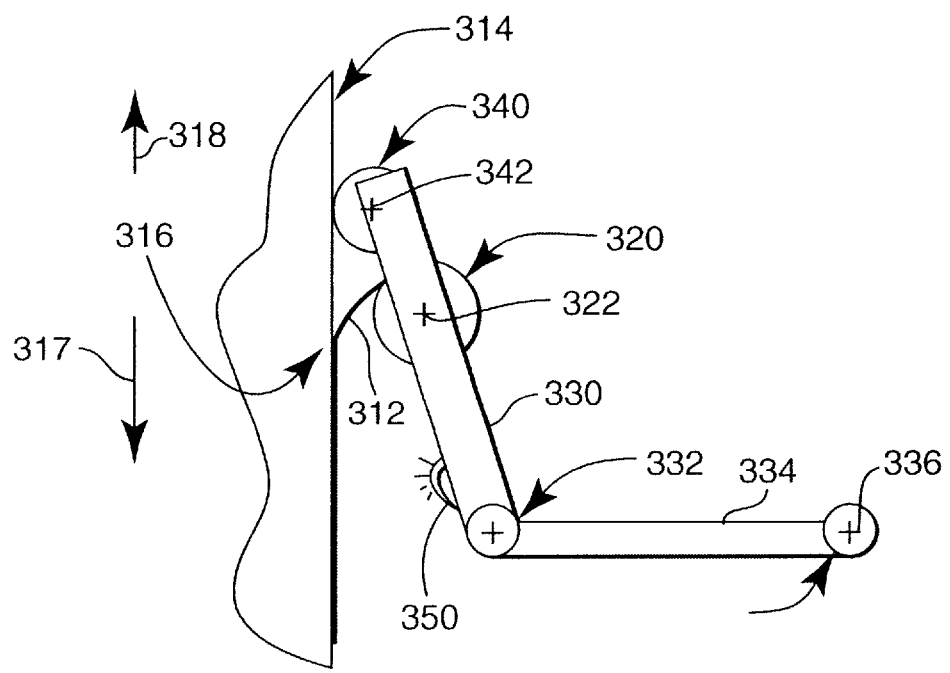
FIG. 10 is a view of the film removal apparatus of FIG. 9 taken along the longitudinal axis 322 in FIG. 9.

FIGS. 9 and 10 depict one illustrative embodiment of an apparatus similar to that depicted in FIGS. 7 and 8, but in which a compressive force used to support the winding roll is removed from the release line 316 along which adhesive film 312 is removed from the substrate 314.

The apparatus 310 of FIGS. 9 and 10 includes a winding roll 320 which rotates about a longitudinal axis 322 and is driven by a motor 324 to rotate about that axis. A torque limiter similar to that used in connection with apparatus 210 of FIGS. 7 and 8 may also be included in the apparatus 310. The winding roll 320 is mounted on a roll frame 330 that rotates about an axis 332. In turn, the roll frame 330 is also attached to a subframe 334 which, itself, rotates about axis 336 in a manner similar to the two-beam linkage described above in connection with apparatus 210.

An additional optional component is depicted in FIGS. 9 and 10 in the form of a support roll 340 mounted on roll frame 330. The support roll 340 is mounted on roll frame 330 in a manner that allows for rotation of support roll 340 about an axis 342. As seen in FIG. 10, the support roll 340 rides along the substrate 314 during the removal process. The support roll 340 preferably supports the winding roll 320 away from contact with the adhesive film 312 while that film 312 is still laminated to the substrate 314. Rather, the winding roll 320 applies only tension to the adhesive film 312, which is removed from the substrate 314 along release line 316.

Much of the tension force applied to the adhesive film 312 during removal by the winding roll 320 can then be transferred back to the substrate 314 in the form of a compressive force by the support roll 340. This arrangement may be beneficial in that the structures needed to support frame 330 relative to the substrate 314 may be reduced by balancing the tension force required to remove adhesive film 312 from substrate 314 with a compressive force provided by support roll 340 on substrate 314.

An additional advantage may be found in the relative positions of the release line 316 and the location of the support roll 340 and corresponding compressive forces applied to the substrate 314 by the support roll 340. By applying the compressive force to the substrate 314 behind the release line (relative to the direction of movement of apparatus 310 and corresponding release line 316), that compressive force will not increase any adhesion between the adhesive film 312 and the substrate 314 just prior to removal.

Another feature of the apparatus 310 and method of removing adhesive film 312 using the apparatus 310 is that the peel angle, i.e., the included angle formed between the adhesive film 312 and the substrate 314 at the release line 316 can be at least partially, if not completely, controlled by varying the rotational speed of the winding roll 320. Control over the peel angle may be useful to reduce the amount of adhesive left on the substrate 314 after the adhesive film 312 is removed, to reduce or prevent stretching and/or breakage of the film 312, etc.

Assuming that the rate of travel of the apparatus 310 in the direction of arrow 317 is uniform, increasing the rotational speed of the winding roll 320 will move the release line 316 farther ahead of the support roll 340 (in the direction of arrow 317). The result is that the peel angle formed between the adhesive film 312 and the substrate 314 will be smaller. Conversely, decreasing the rotational speed of the winding roll 320 will move the release line 316 towards the support roll 340 (in the opposite direction of arrow 317). The result is that the peel angle formed between the adhesive film 312 and the substrate 314 will be larger.

The apparatus 310 may also be operated in the direction of arrow 318 under conditions where the pressure of the support roll 340 does not adversely affect removal of the film 312. Operation in the direction of arrow 318 may provide the added advantage of preventing the film 312 from becoming trapped under support roll 340.

The support roll 340 may be provided in a variety of configurations. For example, it may be preferred that the support roll 340 be mounted for free rotation about its axis 342. Alternatively, support roll 340 may be driven to rotate at some speed which is either the same or different than the speed of the apparatus 310 as it moves along substrate 314 during removal of the adhesive film 312. In addition, although a single support roll 340 is illustrated as one preferred mechanism, it will be understood that alternative mechanisms such as multiple rolls, sliding members, or other alternatives may be substituted for the single support roll 340.

The support roll 340 used in the apparatus may preferably include an outer conformable surface that is soft enough to conform to the substrate 314 in response to the compressive forces generated during the removal process. The use of a conformable roll may, for example, serve to disperse the compressive forces over a larger area, thereby reducing the chances for damage to the substrate 314. The conformability may also be useful to prevent damage as the support roll 340 moves over irregularities or compound curves on the substrate 314, e.g., raised or depressed areas, such as rivets or dents.

To improve removal of the adhesive film 312 from the substrate 314, the apparatus 310 may include an optional heating device 350 positioned to heat the adhesive film 312 before it is removed from the substrate 314 when the apparatus 310 is moving in the direction of arrow 317. It may be preferred that the heating device heat the adhesive film 312 over its entire width. Examples of suitable heating devices 350 include, but are not limited to: infrared heaters, resistance heaters, carbon filaments, quartz irradiators, etc. The thermal energy may be transferred to the film 312 by, e.g., a blower used in connection with a resistance heater. The heating device 350 maybe mounted on apparatus 310 (e.g., on roll frame 330 as depicted), or it may be provided on a separate support apparatus.

Figure 11:
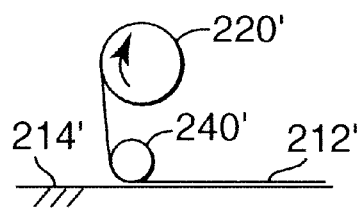
FIGS. 11–13 depict alternative film removal apparatus threading configurations.
Figure 12:
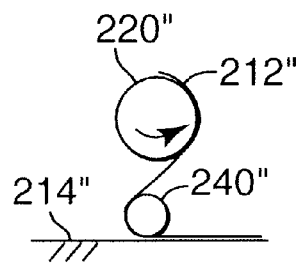

FIGS. 11 and 12 depict variations on the film removal apparatus of the invention in which support rolls 240' and 240" operate in connection with winding rolls 220' and 220", respectively. The adhesive films 212' and 212" are removed from the substrates 214' and 214" along release lines 216' and 216" after passing between the nip formed between the support rolls 240' and 240" and the substrates 214' and 214", respectively. The function of winding the removed adhesive films 212' and 212" is performed by winding rolls 220' and 220". One advantage to these configurations is that the peel angle is controlled by rolls 212' and 212".

Figure 13:
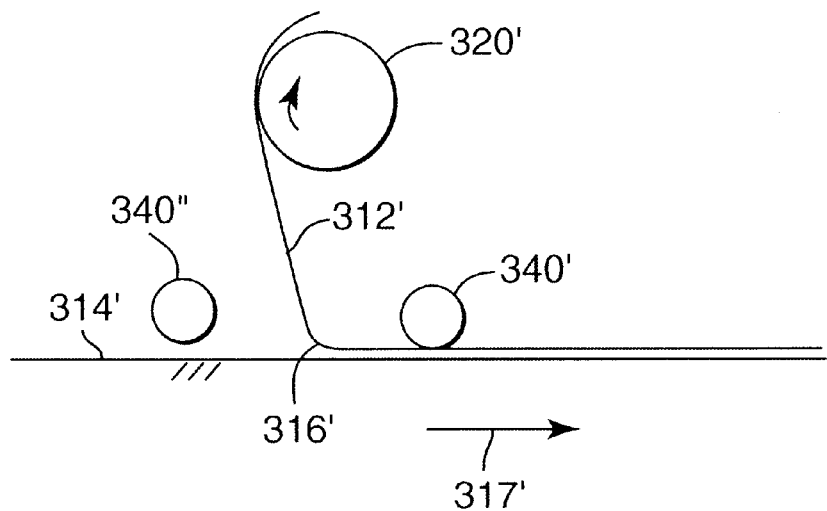

FIG. 13 depicts a variation on the apparatus 310 of FIGS. 9 and 10, in which support roll 340' is located ahead of the release line 316' along which the adhesive film 312' is removed from the substrate 314' as the rolls 320' and 340' move in the direction of arrow 317'. Although the compressive force is located ahead of the release line 316', this configuration may offer some advantages.

For example, if the speed of the winding roll 320' is sufficiently increased relative to the rate at which the entire apparatus is moving in direction 317', the release line 316' may be moved ahead to the support roll 340', resulting in a configuration similar to those depicted in FIGS. 11 and 12. By locating the release line 316' behind the support roll 340', however, the configuration of FIG. 13 offers the opportunity to control peel angle similar to that offered by the apparatus of FIGS. 9 and 10. Another potential advantage of the apparatus of FIG. 13 is that, in those situations in which it is desired to heat the adhesive film 312' before removal, the support roll 340' may be heated. Heating the support roll 340' may offer a particularly effective technique to heat the adhesive film 312' because the combination of heat and pressure may result in more effective heating.

Also depicted in FIG. 13 is an optional secondary support roll 340" located behind the support roll 340' (relative to the travel direction illustrated by arrow 317'). The secondary support roll 340" may be used to distribute the compressive forces over a larger surface area during removal of the adhesive film 312' from the substrate 314'.

Figure 14:
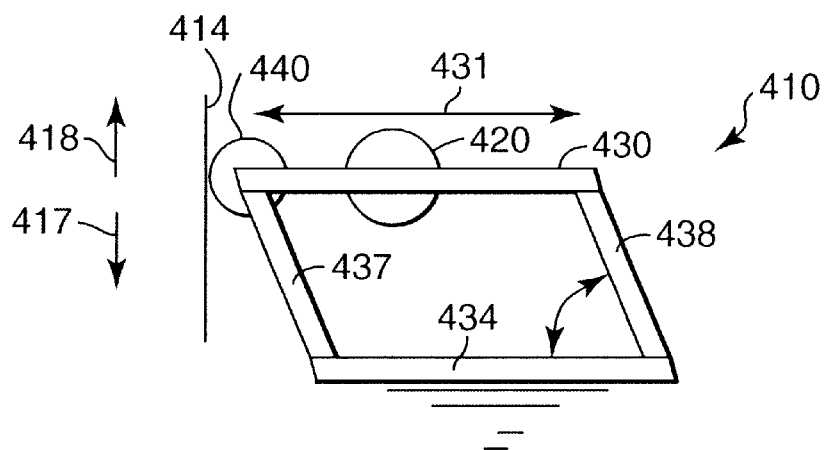
FIG. 14 depicts an alternative film removal apparatus according to the present invention.

FIG. 14 depicts an alternative film removal apparatus including a winding roll 420 and support roll 440 mounted on a roll frame 430 that is rotatably connected to a fixed subframe member 434 by a pair of links 437 and 438. As a result, movement of the rolls 420 and 440 is provided along the direction of arrow 431 as the apparatus 410 moves in the direction of arrows 417 or 418.

Figure 15:
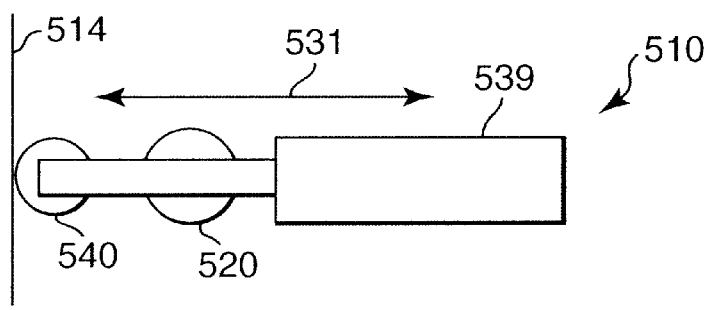
FIG. 15 depicts another alternative film removal apparatus according to the present invention.

FIG. 15 depicts another alternative film removal apparatus 510 in which a winding roll 520 and support roll 540 are mounted on a roll frame 530 that is operably connected to a hydraulic (fluid or gas) cylinder 539. Movement or travel of the roll frame 530 and rolls 520 and 540 may thus be controlled along the direction of arrow 531. Control over movement along arrow 531 may be used to add to the compressive forces generated by the support roll 540 during adhesive film removal. Alternatively, the cylinder 539 may be used to reduce or eliminate any compressive forces that may be applied to the substrate 514 by the support roll 540 by effectively suspending it above the substrate 514. That suspension may also offer another method of controlling peel angle of the adhesive film (not shown) being removed.

Figure 16:
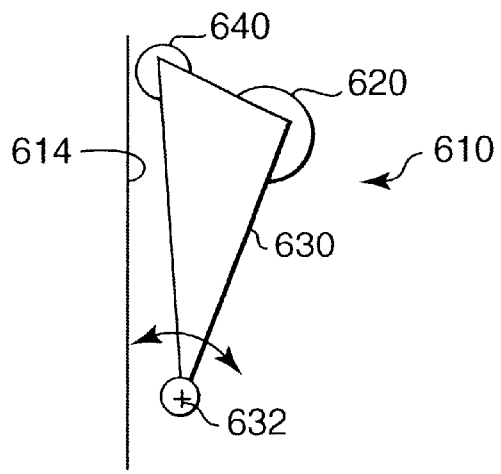
FIG. 16 depicts another alternative film removal apparatus according to the present invention.

FIG. 16 depicts an alternative film removal apparatus 610 that includes a roll frame 630 mounted for rotation about an axis 632. A support roll 640 and winding roll 620 are mounted on the support frame 630 and rotation of the roll frame 630 about axis 632 allows the rolls 620 and 640 to move over discontinuities and irregularities in the substrate 614.

Figure 17:
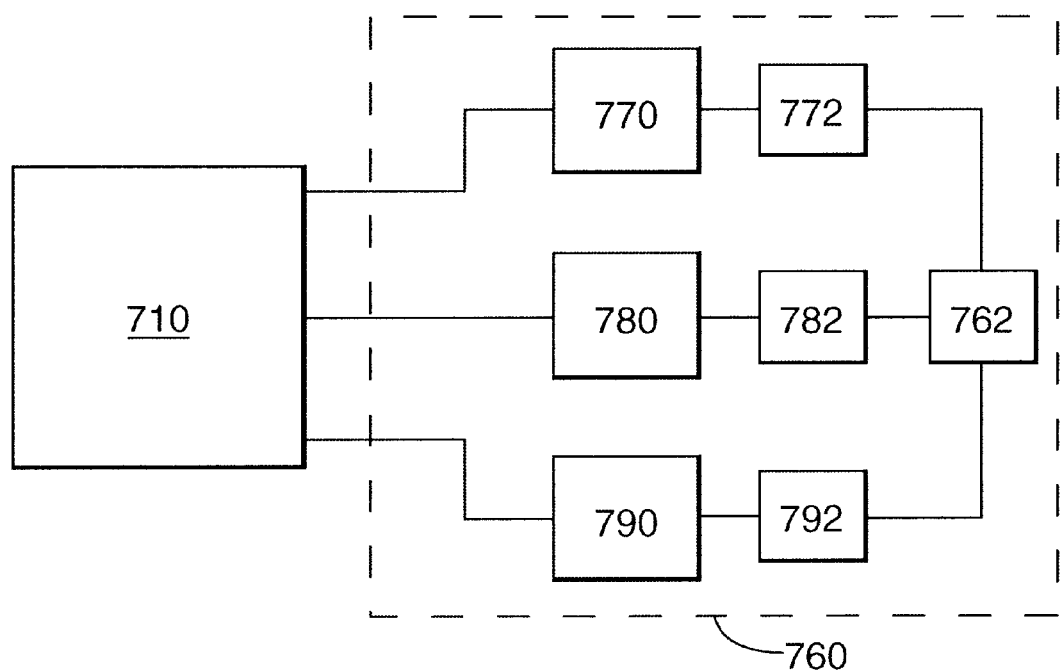
FIG. 17 is a schematic block diagram of one steered laminating apparatus according to the present invention.

FIG. 17 is a schematic block diagram of one embodiment of a steered vacuum-assisted laminating apparatus according to the present invention. The apparatus includes a laminator 710 that may be constructed similar to the laminating devices described above in connection with, e.g., FIGS. 2 & 3. Briefly, however, the laminator 710 preferably includes spaced-apart laminating rolls and a seal mechanism forming a vacuum cavity as described in more detail above.

The laminator 710 is steered along a substrate during lamination of a film using a steering system 760. The illustrated steering system 760 may include a variety of components including, e.g., a vertical control mechanism 770 that can maintain the laminator 710 in a selected vertical position relative to a reference line 762. The steering system 760 may also optionally include a depth control mechanism 780 that can maintain the laminator 710 a selected depth from the substrate. The steering system 760 may also include a vehicle 790 that can move the laminator 710 along the substrate in a travel direction.

The reference line 762 may take a variety of forms but is preferably fixed or stationary relative to the substrate on which the film is to be applied. Typically, the reference line 762 will be straight and may take a variety of forms. Examples of some suitable reference lines 762 may include, but are not limited to, laser beams, features on the substrate (e.g., the edge of trailer wall), guide wires (buried or otherwise), mechanical guides (e.g., wires, bars, etc.) fixed relative to the substrate, etc. The use of a laser beam as a reference line 762 may include the use of a rotating laser beam that defines a reference plane as is well known in, e.g., the construction industry. Alternatively, a laser beam may be aligned parallel to the substrate, thereby defining a straight line relative to the substrate. Depending on its form, the reference line 762 may be detected mechanically (e.g., using limit switches), electrically (e.g., Hall effect sensors, RF sensors, etc.), optically (e.g., using photocells), or by any other suitable technique.

Referring again to FIG. 17, the vertical control mechanism 770 may detect the reference line 762 using a sensor 772 that is selected based on the form of the reference line 762. Similarly, the depth control mechanism 780 may include a sensor 782 that can detect the reference line 762. This embodiment of a depth control mechanism 780 generally requires a reference line 762 that is located a fixed distance from the substrate. The vehicle 790 may also include a sensor 792 for detecting the reference line 762 to assist in moving the laminator 710 in the travel direction. In such an arrangement, it may be preferable that the reference line 762 be parallel to the travel direction. In some instances, at least a portion of the function of the depth control mechanism 780 can be provided by the vehicle 790 when the vehicle 790 is guided along the substrate at a fixed distance from the substrate. For example, the vehicle 790 can provide gross control over the depth between the laminator 710 and substrate, while the depth control mechanism provides fine control over the depth between the laminator 710 and substrate that complements the control provided by the vehicle 790.

Figure 18:
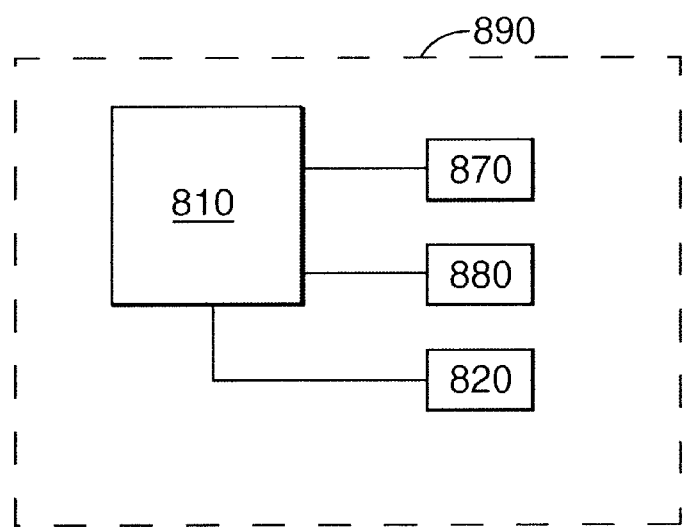
FIG. 18 is a schematic block diagram of another steered laminating apparatus according to the present invention.

FIG. 18 illustrates another illustrative embodiment of a steered vacuum-assisted laminating apparatus according to the present invention. The apparatus includes a laminator 810, vertical control mechanism 870, and optional depth control mechanism 880 all mounted on vehicle 890. Also optionally included in the apparatus is a vacuum source 820 in fluid communication with the laminator 810 to provide the desired vacuum used during laminating.

The travel control mechanism 890 may preferably be a self-contained vehicle, i.e., a vehicle that includes a motor and wheels, tracks, etc. that allow the vehicle 890 to move under its own power. It may be further preferred that the vehicle 890 be a guided vehicle that detects and moves along the substrate at a fixed distance therefrom. The guiding may rely on the reference line used by the vertical control mechanism 870 or it may rely on other reference systems. For example, a vertical reference line may be provided and detected by the vertical control mechanism to control the vertical position of the laminator 810 while a separate vehicle reference line may be provided and detected by the vehicle 890 to guide the vehicle 890 along the substrate.

Figure 19:
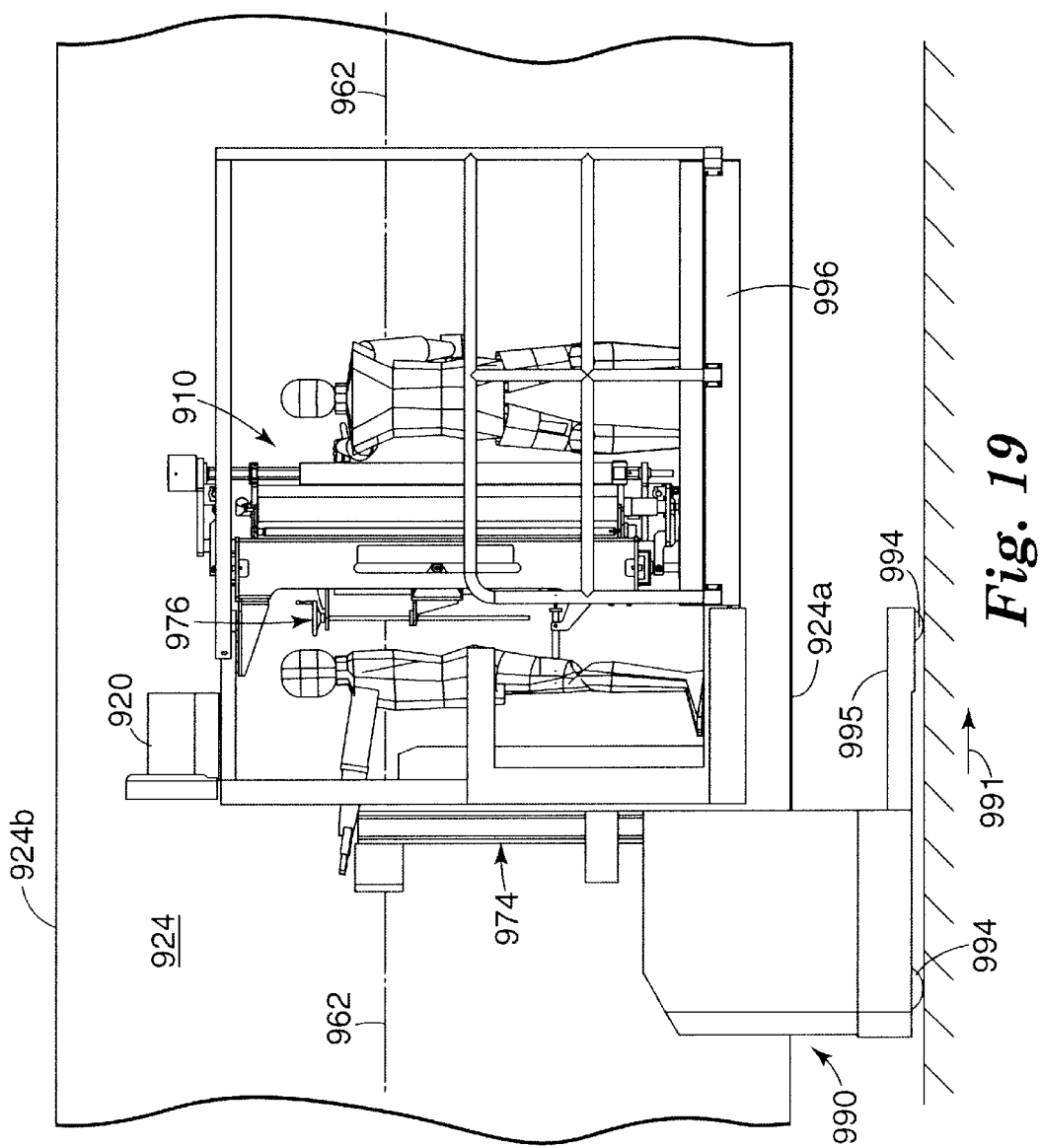
FIG. 19 is a view of a steered laminating apparatus according to the present invention.
Figure 20:
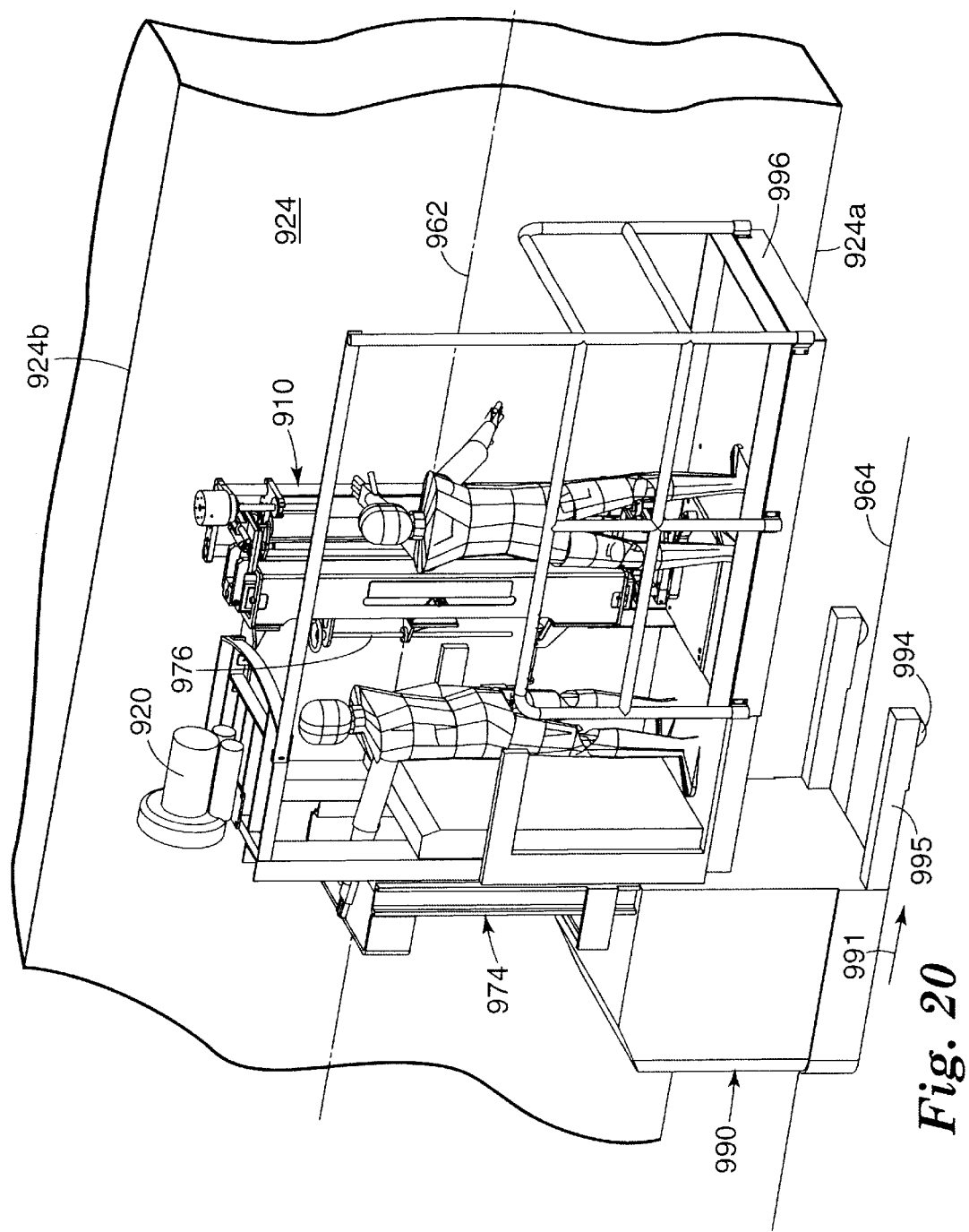
FIG. 20 is a perspective view of the steered laminating apparatus of FIG. 19.

FIGS. 19 and 20 illustrate one embodiment of a steered laminating apparatus that includes a self-contained, guided vehicle 990. The vehicle 990 may, for example, be adapted from a commercially available vehicle. The depicted vehicle includes wheels 994 to move the vehicle 990 in the travel direction as indicated by arrow 991. By "self-contained" as used to describe the vehicle 990, it is meant that the vehicle 990 includes an on-board power source capable of providing power to the various systems mounted on the vehicle 990. For example, the vehicle 990 may include batteries, an internal combustion engine or engines, etc.

A laminator 910 is mounted on the vehicle 990 and is used to apply a film to substrate 924 using vacuum as described above. A reference line 962 is provided to assist with vertical positioning of the laminator 910 (and, ultimately, the film).

The apparatus of FIGS. 19 & 20 also includes a vertical control mechanism provided in two different components. A gross vertical adjustment mechanism 974 is provided to raise the upper deck 996 of vehicle 990 above the base 995 (which is, itself, supported by wheels 994). The gross vertical adjustment mechanism 974 may be provide in any suitable manner, e.g., hydraulic cylinders, scissors-lift, jack screws, etc. Regardless of the exact form, it is desired that the gross vertical adjustment 974 provide rough positioning of the laminator 910 relative to the reference line 962.

Once that rough positioning is accomplished, a fine vertical adjustment mechanism 976 may be provided to more precisely position the laminator 910 relative to the reference line 962. The fine vertical adjustment mechanism 976 may take a variety of forms, e.g., a screw, hydraulic cylinders, etc.

Also seen in FIG. 19 is a vacuum source 920 mounted on the vehicle 990 for supplying vacuum to the laminator 910 during operation. The vacuum source 920 is preferably powered by the same energy source used to move the vehicle 990 in the travel direction 991.

Although the apparatus of FIGS. 19 & 20 is illustrated as relying on reference line 962 for vertical positioning, features such as the lower edge 924a or upper edge 924b of the substrate 924 could also be used for vertical positioning of the laminator 910 (assuming that such features can be correlated with the desired position of the film). In other alternatives, the floor, rails, or other structures supporting the vehicle 990 may be used for vertical positioning if they are suitably straight and/or level relative to the desired position of the laminator 910. Such features or structures may provide alternative forms of mechanical guides as used in connection with the present invention.

FIG. 20 also depicts a separate vehicle reference line 964 along which the vehicle 990 is guided. The vehicle reference line 964 may be provided in the form of a guide wire as is commonly used in connection with guided vehicle systems (which can be detected by a sensor located on the vehicle 990). Alternatively, the vehicle reference line may be provided in the form of a mechanical guide, e.g., a rail or other physical structure along which the vehicle 990 travels. Where the vehicle reference line 964 is located a fixed distance from the substrate 924, it can be used to control the distance between the laminator 910 and the substrate 924.

As seen in FIG. 20, the reference line 962 may preferably extend along the substrate 994 at a fixed distance therefrom. As a result, reference line 962 may also be used to control the distance between the laminator 910 and the substrate 924. The reference line 962 could also be used to guide the vehicle 990 along the substrate 924.

In addition to guiding the vehicle 990 to control the depth between the laminator 910 and the substrate 924, it may also be desirable to include one or more biasing mechanisms to force the laminator 910 towards the substrate 924. Biasing the laminator 910 towards the substrate 924 may provide an advantage in that, if the vacuum is lost, some pressure is maintained on the film being laminated to the substrate 924 until vacuum can be restored or the application process can be stopped.

It may further be preferred to independently bias the upper and lower ends of the laminator 910 towards the substrate 924. By "independently," it is meant that the ends of the laminator 910 are free to move (within limits) without regard to the position of the opposing end of the laminator 910. As a result, the laminator 910 may be better able to maintain contact with a substrate 924 that may not be perfectly vertically aligned with, e.g., the vehicle 990.

Figure 21:
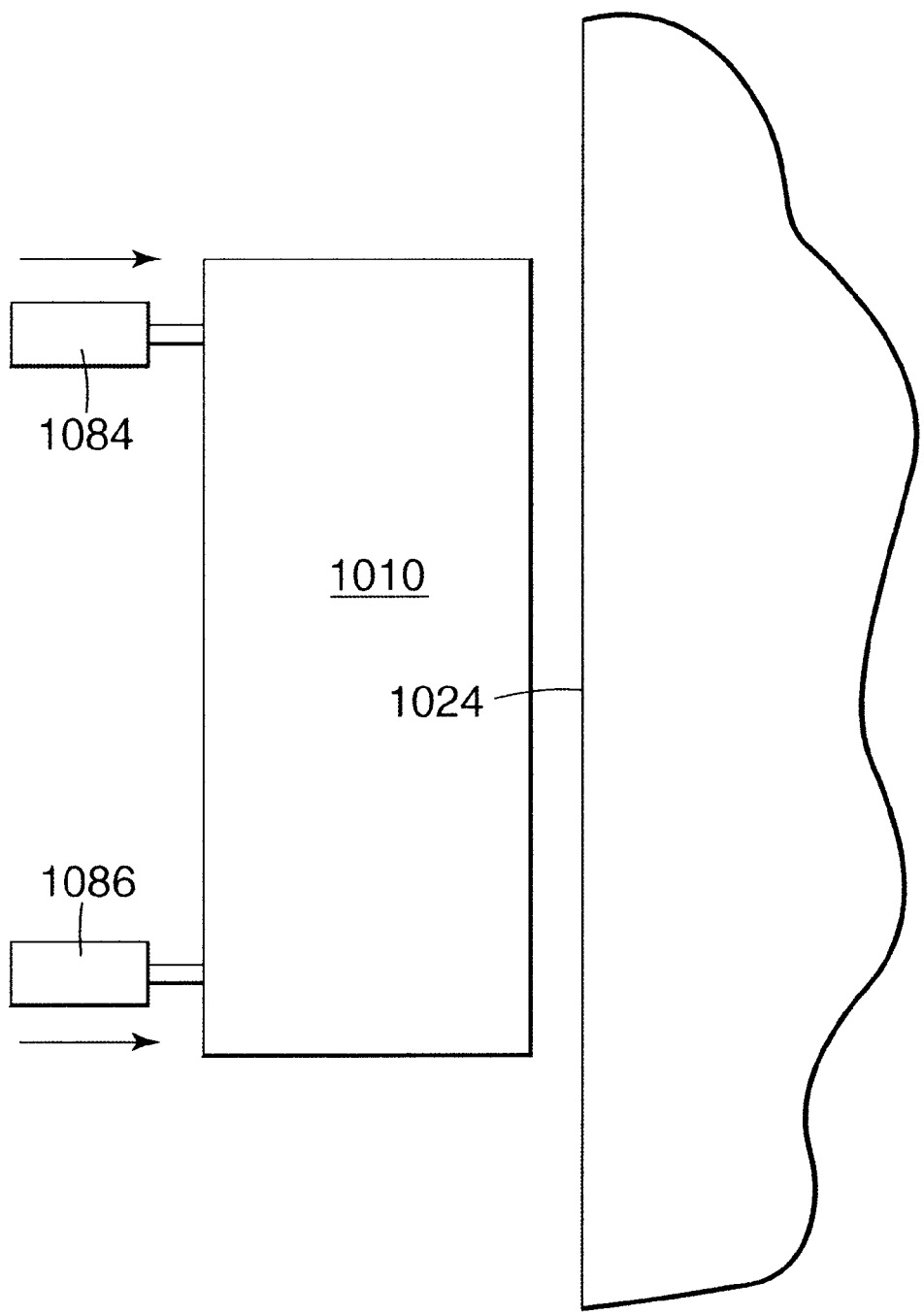
FIG. 21 is a schematic diagram illustrating biasing of a laminator towards a substrate.

Referring to FIG. 21, a schematic diagram of laminator 1010 is depicted including an upper biasing mechanism 1084 and a lower biasing mechanism 1086. Each biasing mechanism acts to force the laminator 1010 towards the substrate 1024. The biasing mechanisms may be provided in any suitable form, e.g., hydraulic cylinders, spring mechanisms, inflatable bladders, solenoids, etc.

Figure 22:
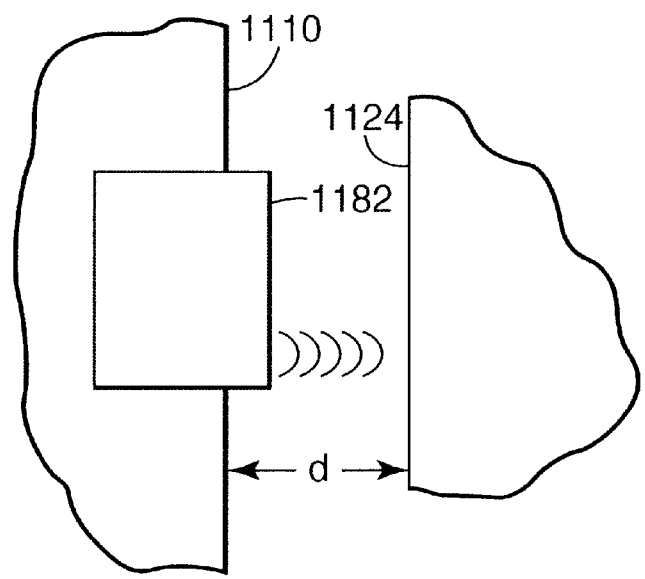
FIGS. 22 & 23 depict alternative mechanisms for guiding a vehicle along the substrate and/or maintaining the selected distance d between the laminator and the substrate.
Figure 23:
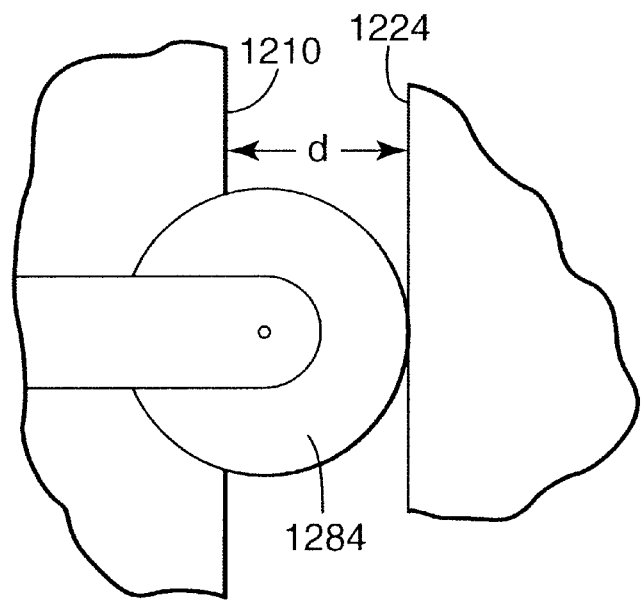

FIGS. 22 and 23 illustrate some alternative techniques and mechanisms for guiding a vehicle along the substrate and/or maintaining the selected distance d between the laminator and the substrate. In FIG. 22, the laminator 1110 includes, e.g., an ultrasonic, infrared, or other non-contact sensor 1182 that detects the substrate 1124. Alternatively, a contact sensor, e.g., mechanical limit switch, may be used to position the laminator 1110 relative to the substrate 1124. Actual positioning of the laminator 1110 may be accomplished, e.g., by steering a vehicle on which the laminator 1110 is mounted. Alternatively, the laminator 1110 may be mounted on, e.g., slides, and moved towards or away from the substrate 1124 by hydraulic cylinders, a jack screw, or any other suitable mechanism.

FIG. 23 depicts a laminator 1210 that includes a mechanical spacer to maintain a selected distance between the laminator 1210 and substrate 1224. The illustrated mechanical spacer is provided in the form of a wheel 1284 that preferably rolls on the substrate 1224, thereby establishing the selected distance d between the laminator 1210 and substrate 1224. Many different mechanical spacers will be known to those skilled in the art, e.g., slides, etc.

EXAMPLE

The following nonlimiting example is provided to illustrate one method of operation of one laminator according to the present invention.

A laminator was constructed according to the principles described in connection with FIGS. 2 and 3. The laminator was used to laminate an adhesive backed film to a floor. A length of the film was unrolled from the film roll and placed (adhesive side down) between the floor and either the first or second laminating roll.

A vacuum was drawn through the vacuum port. Thus, a negative pressure was provided in the vacuum cavity and the first and second laminating rolls were drawn towards the floor.

The laminator was moved along the floor in the lamination direction and the adhesive film was laminated to the floor. The substrates used included: 3M SCOTCHCAL #8910 (clear overlaminate film), 3M SCOTCHCAL #639 (clear protective film), and 3M SCOTCHCAL #3648 (clear overlaminate film). These films are available from 3M Company, St. Paul, Minn. The films were applied easily with no air bubbles trapped between the film and the floor and no wrinkling of the film.

The preceding specific embodiments are illustrative of the practice of the invention. This invention may be suitably practiced in the absence of any element or item not specifically described in this document. The complete disclosures of all patents, patent applications, and publications are incorporated into this document by reference as if individually incorporated in total.

Various modifications and alterations of this invention will become apparent to those skilled in the art without departing from the scope of this invention, and it should be understood that this invention is not to be unduly limited to illustrative embodiments set forth herein, but is to be controlled by the limitations set forth in the claims and any equivalents to those limitations.

What is claimed is:

1. A film lamination and removal system comprising:
   a laminator comprising spaced-apart first and second laminating rolls mounted parallel to each other, a seal mechanism extending between the first and second rolls, wherein the seal mechanism forms a seal with each of the first and second rolls, a vacuum cavity formed between the seal mechanism and the first and second rolls, and a vacuum port in fluid communication with the vacuum cavity; and
   removal apparatus operatively coupled to the laminator, the removal apparatus comprising a winding roll attached to a frame, and a motor operably connected to the winding roll for rotating the winding roll about its longitudinal axis.

2. The system of claim 1, wherein the seal formed by the seal mechanism with each of the first and second laminating rolls comprises a rolling seal.

3. The system of claim 1, wherein the seal mechanism comprises at least one sealing roll mounted generally parallel to the first and second laminating rolls, wherein the sealing roll forms a rolling seal with at least the first roll.

4. The apparatus of claim 3, wherein at least a portion of the length of sealing roll is transparent, wherein the vacuum cavity can be visually monitored through the sealing roll.

5. The system of claim 1, wherein the laminator comprises first and second ends between which the first and second laminating roll extend, wherein the laminator further comprises an end seal at each of the first and second ends, the end seals further defining the vacuum cavity proximate the first and second ends.

6. The system of claim 5, wherein the vacuum port is located in the first end.

7. The system of claim 1, further comprising a vacuum source in fluid communication with the vacuum port.

8. The system of claim 1, wherein each of the first and second laminating rolls each comprise a conformable outer surface.

9. The system of claim 1, further comprising a heating device located outside of the vacuum cavity.

10. The system of claim 1, further comprising a heating device located within the vacuum cavity.

11. The system of claim 1, wherein the first laminating roll comprises a heated roll.

12. The system of claim 11, wherein the support roll comprises an outer conformable surface.

13. The system of claim 1, wherein the removal apparatus further comprises a support roll rotatably attached to the frame, the support roll located a fixed distance from the winding roll, wherein tension generated during film removal is transferred to a substrate by the support roll.

14. The system of claim 1, further comprising a film removal heater.

15. A method of laminating a film to a substrate, the method comprising:
   providing a system according to claim 1;
   locating the system proximate a substrate, wherein the substrate further defines the vacuum cavity;
   locating an adhesive film between the substrate and at least one of the first and second laminating rolls;
   drawing a vacuum through the vacuum port, wherein a negative pressure is provided in the vacuum cavity and wherein the first and second laminating rolls are drawn towards the substrate; and
   moving the system along the substrate in a lamination direction, whereby the adhesive film is laminated to the substrate.

16. The method of claim 15, further comprising varying the negative pressure within the vacuum cavity.

17. The method of claim 15, wherein the seal mechanism comprises at least one sealing roll mounted generally parallel to the first and second laminating rolls, wherein the sealing roll forms a rolling seal with at least the first roll; and further wherein the adhesive film passes through the rolling seal formed by the sealing roll and the first roll when moving the system along the substrate in the lamination direction.

18. The method of claim 15, further comprising removing a liner from the adhesive film after the adhesive film passes through the rolling seal.

19. A method of laminating a film to a substrate, the method comprising:

provinding a system according to claim 1;

locating the system proximate a floor, wherein the floor further defines the vacuum cavity;

locating an adhesive film between the floor and at least one of the first and second laminating rolls;

drawing a vacuum through the vacuum port, wherein a negative pressure is provided in the vacuum cavity and wherein the first and second laminating rolls are drawn towards the floor; and moving the system along the floor in a lamination direction, whereby the adhesive film is laminated to the floor.

20. The method of claim 19, further comprising varying the negative pressure within the vacuum cavity.

21. The method of claim 19, wherein the seal mechanism comprises at least one sealing roll mounted generally parallel to the first and second laminating rolls, wherein the sealing roll forms a rolling seal with at least the first roll; and further wherein the adhesive film passes through the rolling seal formed by the sealing roll and the first roll when moving the system along the substrate in the lamination direction.

22. A method of laminating and removing adhesive films from a substrate, the method comprising:

providing a system according to claim 1;

locating the system proximate a substrate, wherein the substrate further defines the vacuum cavity;

applying tension to a first end of an existing adhesive film adhered to a substrate over the width of the existing adhesive film to remove the existing adhesive film from the substrate along a release line;

distributing the tension on the substrate in the form of a compressive force;

advancing the release line and the compressive force towards a second end of the existing adhesive film, whereby the existing adhesive film is removed from the substrate;

locating a new adhesive film between the substrate and at least one of the first and second laminating rolls;

drawing a vacuum through the vacuum port, wherein a negative pressure is provided in the vacuum cavity and wherein the first and second laminating rolls are drawn towards the substrate; and moving the system along the substrate in a lamination direction, whereby the new adhesive film is laminated to the substrate.

23. A method according to claim 22, wherein the existing adhesive film is removed from the substrate and the new adhesive film is laminated to the substrate in one pass of the system over the substrate.

24. A method according to claim 22, wherein the compressive force is applied to the substrate along the release line.

25. A method according to claim 22, wherein the compressive force is applied to the substrate at a distance from the release line.

26. A method according to claim 25, wherein the compressive force is applied to the substrate behind the release line as the release line advances toward the second end of the existing adhesive film.

27. A method according to claim 25, wherein the compressive force is applied to the substrate ahead of the release line as the release line advances toward the second end of the existing adhesive film.

28. A method according to claim 25, further comprising varying the distance between the compressive force and the release line.

29. A method according to claim 28, wherein varying the distance between the compressive force and the release line comprises varying the tension applied to the existing adhesive film.

30. A method according to claim 22, wherein applying tension over the width of the adhesive film comprises attaching the first end of the existing adhesive film to a winding roll and winding the existing adhesive film thereon.

31. A method according to claim 22, wherein the compressive force is applied to the substrate by a support roll attached to the frame of the removal apparatus, and further wherein the winding roll and the support roll are located a fixed distance apart.

32. A method according to claim 22, further comprising heating the existing adhesive film before removing the existing adhesive film from the substrate along the release line.

33. A method according to claim 22 wherein the substrate comprises a floor.

\* \* \* \* \*

UNITED STATES PATENT AND TRADEMARK OFFICE
CERTIFICATE OF CORRECTION

PATENT NO.    : 6,706,131 B2
DATED         : March 16, 2004
INVENTOR(S)   : Steelman, Ronald S.

It is certified that error appears in the above-identified patent and that said Letters Patent is hereby corrected as shown below:

<u>Column 7,</u>
Line 34, please delete "2000" and insert in place thereof -- 1000 --.

Signed and Sealed this

Third Day of August, 2004

JON W. DUDAS
*Acting Director of the United States Patent and Trademark Office*